United States Patent [19]

Telkes

[11] 3,986,969
[45] Oct. 19, 1976

[54] THIXOTROPIC MIXTURE AND METHOD OF MAKING SAME

[75] Inventor: Maria Telkes, Newark, Del.

[73] Assignee: The University of Delaware, Newark, Del.

[22] Filed: Feb. 6, 1975

[21] Appl. No.: 547,606

[52] U.S. Cl. .............................. 252/70; 126/400; 252/317
[51] Int. Cl.² ...................... C09K 3/00; F24H 7/00
[58] Field of Search ............... 126/400; 252/70, 317

[56] References Cited
UNITED STATES PATENTS

| | | | |
|---|---|---|---|
| 2,677,664 | 5/1954 | Telkes | 252/70 |
| 2,706,716 | 4/1955 | Howe et al. | 252/70 |
| 3,191,392 | 6/1965 | Donnelly | 252/67 X |
| 3,720,198 | 3/1973 | Laing et al. | 126/400 |

*Primary Examiner*—Harris A. Pitlick
*Attorney, Agent, or Firm*—C. W. Mortenson

[57] ABSTRACT

A mixture for the storage of heat energy utilizing a heat of fusion material includes sodium sulfate decahydrate, borax as a nucleating agent, and hydrous magnesium aluminum silicate (attapulgus clay) as a homogenizing agent. This composition maintains the salt-hydrate in suspension during repeated heating and cooling cycles.

A method is also disclosed for preparing the mixture which includes the steps of mixing water with the attapulgus clay, adding a nucleating agent to the initial mixture, and mixing the initial mixture, including the nucleating agent, with a heat of fusion material such as sodium sulfate decahydrate.

17 Claims, No Drawings

THIXOTROPIC MIXTURE AND METHOD OF MAKING SAME

BACKGROUND OF THE INVENTION

With the increased use of solar energy heating, it becomes almost an absolute necessity that thermal energy be stored in order to spread the excess solar heat available during the daytime for use at night and on cloudy days. The use of heat of fusion material for this heat storage has gained increasing favor in recent times due to its low cost and high heat of fusion per unit weight. Such heat of fusion materials desirably should meet the criteria of low cost, availability in large quantities, and simplicity of preparation. In addition, it is preferred that they be non-toxic, non-flammable, non-combustible and non-corrosive. The lowest cost materials for use are large volume chemicals based on compounds of sodium, potassium, magnesium, aluminum and iron. Preferably, the materials are in the form of salt-hydrates and their eutectics. The type of low cost compounds are restricted to chlorides, nitrates, sulfates, phosphates and carbonates, while additives or modifiers may include borates, hydroxides and silicates. Among those low cost salt-hydrates having high heat of fushion, low cost and lowest incompatibility due to undesirable properties are included:

| Chemical Compound | | Melting Point, °F | Heat of Fusion BTU per Pound | Density lb/ft$^3$ |
|---|---|---|---|---|
| Calcium chloride hexahydrate | $CaCl_2 \cdot 6H_2O$ | 84–102 | 75 | 102 |
| Sodium carbonate decahydrate | $Na_2CO_3 \cdot 10H_2O$ | 90–97 | 106 | 90 |
| Disodium phosphate dodecahydrate | $Na_2HPO_4 \cdot 12H_2O$ | 97 | 114 | 95 |
| Calcium nitrate tetrahydrate | $Ca(NO_3)_2 \cdot 4H_2O$ | 102–108 | 60 | 114 |
| Sodium sulfate decahydrate | $Na_2SO_4 \cdot 10H_2O$ | 88–90 | 108 | 97 |
| Sodium thiosulfate pentahydrate | $Na_2S_2O_3 \cdot 5H_2O$ | 118–120 | 90 | 104 |

In use these materials are usually placed in sealed containers together with a nucleating agent and subjected by the system to successive heating and cooling cycles above and below the melting point of the heat of fusion material selected to use the "stored" heat or cold.

The need for nucleating agents is described in U.S. Pat. No. 2,677,664 issued May 4, 1954 to Maria Telkes. As is described in the Telkes patent, a suitable heterogenous nucleating agent may be borax (sodium tetraborate decahydrate) in small quantities, about 2 to 5%. These nucleating agents provide for the necessary seeding to initiate the formation of crystals and thereby avoid supercooling which can occur in liquid solutions at rest. Other known nucleating techniques may be used to promote crystallization. Crystallization, of course, is necessary to make use of the heat of fusion of the material. With supercooling, only the specific heat of the material is used. The specific heat of a material is far less than its heat of fusion — hence the need for nucleation. When using sodium tetraborate decahydrate (a near-isomorphous nucleating agent) in combination with $Na_2SO_4 \cdot 10H_2O$, it is possible to obtain complete crystallization in a melt by inverting or occasionally shaking the container after the crystals start to form. When used for the storage of heat energy, unfortunately, it is not always convenient, or for that matter, possible to shake the containers.

Another problem encountered in utilizing heat of fusion materials has been that after several cycles of heating and cooling, liquid tends to separate from the salt-hydrate and form salt crystals of lower hydration or for that matter, anhydrous salt, with a corresponding loss of available heat of fusion.

Stated differently, the melting of sodium sulfate decahydrate and many other salt-hydrates is found to be partly incongruent. That is, during melting some anhydrous sodium sulfate remains undissolved in its water of crystallization which is released in the melting. Due to its higher density, sodium sulfate sinks in the saturated solution. When the mixture solidifies again without mechanical mixing or stirring, dissolved sodium sulfate combines with water of crystallization, but those heavy crystals of sodium sulfate on or near the bottom of the container recombine only with water molecules in their immediate vicinity forming solid sodium sulfate decahydrate crystals. This solid layer prevents further recombination of the remaining sodium sulfate with the balance of the water of crystallization. Due to this effect, molten sulfate decahydrate, when it solidifies without stirring or without additives, forms three distinct layers — a bottom layer of white anhydrous sodium sulfate crystals, some embedded into crystals of sodium sulfate decahydrate, then a larger intermediate layer of translucent sodium sulfate decahydrate crystals, and on top, a layer of liquid saturated solution. The heat of fusion required to melt this salt is 108 BTU's per pound which could be released again if the salt could be homogenized during solidification by stirring or by suitable additives. During cooling, (without homogenizing or stirring), the heat release is less, because part of the sediment cannot regain its water of crystallization. Some saturated solution remains in this case when the mixture is cooled depending upon the solubility of the salt. Separation and settling of the salt-hydrate must be prevented.

Over the years various thickening agents have been included in heat storage mixtures as additives with thhe aim of producing a gel in which the salt-hydrate does not settle out even over successive heating/cooling cycles. Many different thickening agents have been tried including wood shavings, wood pulp, sawdust, various types of cellulosic mixtures, and an organic material sold under the tradename "METHOCELL", starch and organic alginates. Inorganic thickening agents were also used, such as silica gel, diatomaceous earth, and other finely divided silica products. Many of these materials perform quite well but only for a limited number of cycles. Some of the organic materials become slowly hydrolyzed or decomposed by bacteria or by enzyme action. In many cases such action can be prevented or slowed by adding small quantities of formaldehyde or other suitable agents. Wood shavings, wood pulp and the like were not found to be durable enough. Silica gel formed in the mixture itself proved to be a hindrance to filling the mixture into containers because it thickened too quickly.

Eutectics of the salt-hydrates are used to modify the freezing point of the various hydrates. For the most part, the eutectics are based on low cost compounds such as sodium chloride, ammonium chloride, potassium chloride and other known types. Most eutectics also require a nucleating agent as well as a homogenizing or thickening agent since they tend to melt partly incongruently. The homogenizing agent prevents the settling of the higher density anhydrous components.

Accordingly, it is an object of this invention to obviate many of the disadvantages of the prior art heat of fusion mixtures.

Another object of this invention is to provide an improved heat of fusion material in which water and the salt-hydrate have a reduced tendency to separate during freezing and melting.

A further object of this invention is to provide an improved method for making heat of fusion mixtures which melt the same way as congruent materials do.

BRIEF DESCRIPTION OF THE INVENTION

In accordance with a preferred embodiment of this invention a mixture for the storage of heat energy utilizing the heat of fusion of a material comprises salt-hydrate, a nucleating agent and a homogenizing agent, wherein the homogenizing agent is a clay-type substance which exhibits thixotropy. The clay-type substance is made up of particles that are lath-like in appearance. Preferably, an attapulgus-type clay is used.

A preferred method of preparing a mixture for the storage of heat energy, as described above, includes the steps of mixing water with a clay-type substance which exhibits thixotropy by virtue of its particles being lath-like to form an initial mixture, and mixing the initial mixture with a salt to form the hydrate. When the composition is thus prepared, it provides a stable suspensoid exhibiting thixotropic properties which encapsulates all of the crystals of the salt-hydrate and prevents them from dropping to the bottom of the container and thereby diminishing the heat of fusion. In short, such mixture prevents the salt-hydrate from melting incongruently such that the salt-hydrate does not separate from the solution.

DETAILED DESCRIPTION OF THE INVENTION

The mixture of this invention acts as a homogenizing or thickening agent for salt-hydrate materials used for the storage of thermal energy. The thickening agent prevents water solution from separating out of the salt crystals due to partly incongruent melting of the salt crystals during the successive heating and cooling cycles which typically occurs in such materials when used for the storage of thermal energy. Salt-hydrates that may be used for the storage of thermal energy include those set forth hereinbefore. These preferred salt-hydrates, which practically should have a heat of fusion greater than 50 BTU per pound, include calcium chloride hexahydrate, sodium carbonate decahydrate, disodium phosphate dodecahydrate, calcium nitrate tetrahydrate, sodium sulfate decahydrate, and sodium thiosulfate pentahydrate. These are selected because of their relatively high heat of fusion (more than 50 BTU per pound) and low cost as described previously. The mixture, including such salt-hydrates together with a suitable nucleating agent, if desired, of known type, is made up to prevent the solution from supercooling instead of crystallizing during the cooling phase. Preferably, a salt-hydrate having a heat of fusion of more than 100 BTU per pound is used (see above table).

According to this invention, a unique homogenizing agent is used to prevent the incongruent melting of the salt-hydrates during successive heating and cooling cycles. The homogenizing agent in accordance with this invention is a clay-type substance which exhibits thixotropy and whose particles are lath-like in structure. Any of the known nucleating agents or devices may be used in this mixture. Such nucleating agents include those agents disclosed in the said Telkes patent, and for sodium sulfate decahydrates a heterogeneous nucleating agent such as sodium tetraborate decahydrate in small quantities, usually about 2% to about 5%, with the preferred range being about 3% to about 4% based on the weight of the total salts. Other nucleating agents may be used as well as the nucleating devices described and claimed in my co-pending U.S. patent application Ser. No. 531,674 filed Dec. 11, 1974.

The thixotropic or homogenizing agents which are used in this mixture should have a relatively low cost. As is known, thixotropic agents form highly fluid suspensions with water (or other solvents) while the mixture is stirred or agitated. On the other hand, when it rests, the mixture thickens forming a gel usually after a short period of time.

In accordance with this invention, a clay-type thixotropic agent is used whose particles are lath-like in structure and which provide a high colloidal stability in the presence of salt solutions and other electrolytes. Clays of this type which are suitable for use with this invention are known as attapulgite, polygorskite or sepiolite. Hereinafter such clays will be referred to as attapulgite-type clays. One such attapulgite-type clay is available commercially under the tradename "Min-U-Gel 200" manufactured by the Floridin Company of Berkely Springs, West Virginia. This particular material is a calcium silicate hydrate which is finer than 200 mesh. Attapulgite clay has the chemical formula $(OH_2)4(OH)_2Mg_5Si_8O_{20}\cdot 4H_2O$. Based upon this theoretical formula, attapulgite is a hydrous magnesium silicate, or more specifically, a hydrous aluminum magnesium silicate, since aluminum ions can be substituted for magnesium and silicon ions in the crystal structure. Thus, the actual chemical analysis typically shows the presence of an aluminum oxide ($Al_2O_3$). A typical chemical analysis of this clay is as follows:

| Oxide | Attapulgite |
|---|---|
| $SiO_2$ | 57.85 |
| $Al_2O_3$ | 7.89 |
| $Fe_2O_3$ | 2.82 |
| FeO | — |
| MgO | 13.44 |
| CaO | 0.30 |
| $K_2O$ | 0.08 |
| $Na_2O$ | 0.53 |
| TiO | — |
| $H_2O-$ | |
| $H_2O+$ | 16.95 |
| TOTAL | 99.86 |

Structurally, attapulgite consists of a double chain of tetrahedrons of silicon and oxygen parallel to the long axis. The double chain is linked by a spaced layer of magnesium atoms in sixfold combination. In turn, the chains form a network of strips which are joined together along the edges. Eight water molecules are contained in each crystal unit. Attapulgite clay can be visualized as a bundle of lath-shaped units held together at their long edges. Because of this unique structure, i.s., three dimensional chains, attapulgite clay cannot swell as do clays such as montmorillonite clays which are sheet or plate-like. In addition, the cleavage parallel to the 110 plane along the Si—O—Si bonds gives the particles a lath-like appearance.

When the clay is dispersed in water, the lath-shaped units tend to separate into smaller bundles by cleavage along these edges where the laths are joined together. The degree of split-up is a function of the amount of work that enters into the disaggregation. The individual laths may separate but they tend to remain bundles not unlike brush heaps or haystacks. It is this tendency to form a haystack-type structure which is believed to give attapulgite clays their unusual properties which render them particularly suitable for use with heat of fusion mixtures. The haystack structure maintains the surface support of the crystals. It is the unusually high surface area which give attapulgite such a high adsorption. This large surface area together with the bundling tendency gives attapulgite its properties. The surface area of commercial grades of attapulgite varies from 210 m$^2$/g down to 125 m$^2$/g. Attapulgite can take up water to 200% of its own weight. Specifically, it is the surface area which attracts water molecules and which in turn permits the clay to retain its colloidal properties even in the presence of electrolytes.

Lath-like clays have many advantageous rheological properties which render them particularly useful with this invention. When the lath-like crystals dissociate to form a random lattice, it entraps liquid to increase the viscosity of the system. They can thicken both fresh and salt water. Their suspensions are thixotropic and have a high viscosity even at low concentrations. The viscosity of their suspensions can be modified by additives, dispersants in aqueous systems, and surfactants in non-aqueous media.

A typical attapulgite lath has a length of about 1 micron, a width of about 0.01 micron and a thickness of about 50–100 Angstroms. Stated differently, the length to thickness ratio of a lath is about 1000 whereas the length to width ratio of a lath is about 100.

Chemically, attapulgite clays in colloidal suspension, as noted, are usually unaffected by salts. They are not flocculated. Many other electrolytes, particularly those salt-hydrates used as heat of fusion materials, also have little effect.

According to the preferred method of this invention, a heat of fusion material is prepared which is stable and melts congruently even over many cycles of heating and cooling (melting and crystallizing) such that the heat of fusion of the material may be used to store heat or cold. As a first step of the method, water is mixed vigorously with attapulgite clay, the thixotropic agent, to form an initial mixture. It is often desirable that the initial mixture be allowed to stand for some hours and repeatedly mixed at intervals. Next, a nucleating agent such as borax in fine crystalline form, is added to the mixture, stirred thoroughly and the resultant product is mixed with the required amount of a salt-hydrate by way of example, sodium sulfate decahydrate. A nucleating device such as that described in my co-pending U.S. patent application Ser. No. 531,674 filed Dec. 11, 1974 may be used and the agent omitted if desired.

The resulting mixture can be easily poured from a tank or mixing container while agitated into the desired storage tubes or other storage system. The filled storage containers are sealed. The mixture sets to a gel rather rapidly after it is no longer agitated. The containers are now ready for use in a heat and/or cold storage system of known type. As noted they are capable of many cycles of heating and cooling with congruent melting of the salt-hydrate so that efficient production and use of the high heat of fusion of the salt-hydrate is attained.

EXAMPLE

A thermal storage mixture was prepared as described in accordance with this invention having the following composition by weight: water 56 parts; attapulgite clay (Min-U-Gel 200) 7 to 10 parts; borax 3 parts; sodium sulfate decahydrate 44 parts. This mixture has been subjected to more than 100 successive heating and cooling cycles, the equivalent of more than 5 years use, without any apparent water separation. All of the heat of fusion of the salt-hydrate was used rendering this mixture a very effective thermal storage material.

The following experiments were made by way of contrast with the above Example of the invention.

a. The salt-hydrate composition used in the Example was tested with other thickening additives, subjecting the mixture to alternate heating and cooling cycles. In one experiment the additive was bentonite. This clay was used in up to 10% by weight. Liquid separation could be observed after 8 cycles.

b. In another experiment, asbestos fiber-pulp was employed in amounts up to 10% by weight. Some segregation could be observed after 5 cycles.

c. In still another case, a clay not having lath-like particles was tested in amounts up to 10% by weight. Although the clay was an excellent thickening agent, it was unable to prevent segregation to some extent after 4 cycles.

d. In further testing, use of some of the more expensive organic agents based on Kelp extracts made it possible to obtain nearly 100 cycles, but their used was unreliable if the material was kept in the molten state for longer periods.

Eutectic mixtures can also be used with the same thixotropic additive, in accordance with this invention, to store cold. Eutectic mixtures of the salt-hydrates have a lower freezing point than the typical salt-hydrate, and hence are capable of storing cold at low enough temperatures to be effective in air conditioning applications. In any event, dispersants, wetting agents and the like desirably may be used with either the salt-hydrates or eutectic mixtures of the salt-hydrates. Such use reduces the amount of the thixotropic agent required and can in many cases reduce the cost considerably.

The additive to Min-U-Gel 200, a grade attapulgite clay available from the Floridin Co., may be dispersed using tetrasodium pyrophosphate (TSPP), an inexpensive, readily available material. The dispersant is used in amounts of 2 to 3% by weight of Min-U-Gel used. The recommended process consists of dissolving TSPP in the required amount of water and then adding Min-U-Gel and stirring rapidly for a short period. Dispersion occurs rapidly and the maximum viscosity is obtained promptly, without the need of allowing several hours of mixing and standing to obtain the same result without the use of TSPP.

As to eutectic mixtures, the following table shows some salts used with sodium sulfate decahydrate to produce thickened mixtures within this invention, the table showing the molar ratios employed. Eutectic mixtures that can be used with the thickened sodium sulfate decahydrate mixture contain the following compounds:

| Melting Point of the Eutectics | Added Eutectic Component Mols per mol $Na_2SO_4 \cdot 10H_2O$ |
| --- | --- |
| 70 to 75° F | 0.5 to 1.0 $KNO_3$ (Potassium nitrate) |
| 65° F | 1.0 NaCl (Sodium chloride) |
| 50 to 55° F | 0.5 to 0.75 each of NaCl + $NH_4Cl$ (Sodium chloride + Ammonium chloride) |
| 50° F | 1.0 $NH_4Cl$ (Ammonium chloride) |
| 40° F | 1.0 KCl (Potassium chloride) |

In general, it is preferred to use about 92% to about 95% of the salt-hydrate or eutectic mixture with about 5% to about 8% of the thixotropic agent. The nucleating agent may be either borax or a nucleating device as disclosed in my co-pending U.S. patent application Ser. No. 531,674 filed Dec. 11, 1974. It is also to be appreciated that the thixotropic agents used in this invention can be used with most other salt-hydrates and that sodium sulfate decahydrate and the others mentioned specifically herein are given only as illustrative and to enumerate preferred embodiments.

There has thus been described the use of attapulgite-type clay as a homogenizing agent with salt-hydrates and eutectic mixtures thereof for use as heat of fusion materials in the storage of solar energy. In addition, unique methods of forming such mixtures are disclosed.

Many embodiments may be made of this inventive concept, and many modifications may be made in the embodiment hereinbefore described. Therefore, it is to be understood that all descriptive material herein is to be interpreted merely as illustrative, exemplary and not in a limited sense. It is intended that various modifications which might readily suggest themselves to those skilled in the art be covered by the following claims, as far as the prior art permits.

What is claimed is:

1. A mixture for the storage of heat energy utilizing the heat of fusion of the composition comprising:
   a salt-hydrate having a heat of fusion of more than 50 BTU per pound,
   a nucleating agent, and
   a thixotropic agent, said thixotropic agent being an attapulgite-type clay substance that has lath-like particles.

2. A composition according to claim 1 wherein the thixotropic agent is a calcium silicate hydrate finer than 200 mesh.

3. A composition according to claim 1 wherein said salt-hydrate is a salt-hydrate eutectic for the storage of cold.

4. A composition according to claim 1 wherein said thixotropic agent is a hydrous magnesium silicate.

5. A composition according to claim 4 wherein said thixotropic agent includes an aluminum oxide.

6. A composition according to claim 1 wherein said thixotropic agent is attapulgite clay.

7. A composition according to claim 1 where said mixture consists of about 56 parts water, 7 to 10 parts attapulgite clay, 3 parts borax, 44 parts sodium sulfate decahydrate, all by weight.

8. A composition according to claim 1 wherein said lath-like particles are about 1 micron in length, 0.01 microns in width, and 50–100 Anstroms in thickness.

9. A composition according to claim 1 wherein said lath-like particles have a length to thickness ratio of about 1000.

10. A composition according to claim 1 wherein said lath-like particles have a length to width ratio of about 100.

11. A composition according to claim 1 wherein said salt-hydrate has a heat of fusion or more than 100 BTU per pound.

12. A method of preparing a mixture for the storage of heat energy comprising the steps of:
    mixing water with an attapulgite-type clay substance having lath-like particles which exhibits thixotropy to form an initial mixture, with said substance dispersed in water, and
    mixing said initial mixture with a nucleating agent and a salt to maintain a salt-hydrate having a heat of fusion of more than 50 BTU per pound.

13. A method according to claim 12 wherein said clay-type substance is a hydrous magnesium silicate.

14. A method according to claim 12 wherein said clay-type substance is a hydrous magnesium aluminum silicate.

15. A method according to claim 12 wherein a dispersant is initially dissolved in said water prior to mixing the water with said clay-type substance.

16. A method according to claim 12 wherein said clay-type substance is attapulgite clay.

17. A method according to claim 12 wherein said salt-hydrate has a heat of fusion of more than 100 BTU per pound.

* * * * *

UNITED STATES PATENT OFFICE
CERTIFICATE OF CORRECTION

Patent No. 3,986,969                Dated October 19, 1976

Inventor(s) Maria Telkes

It is certified that error appears in the above-identified patent and that said Letters Patent are hereby corrected as shown below:

Column 1, line 26, "fushion" to read ---fusion---.

Column 2, line 20, "molten sulfate decahy-drate" should read --- molten sodium sulfate decahydrate ---.

Column 3, line 54, "occurs" should read --- occur ---.

Column 5, line 62, delete "hydrate".
Column 5, line 63, delete "decahydrate".
Column 6, line 16, delete "decahydrate".
Column 6, line 40, "used" should read --- use ---.
Claim 7, last line, delete "decahydrate ---.
Claim 8, last line, "Anstorms" should read ---Angstroms ---.

Signed and Sealed this

Twenty-first Day of June 1977

[SEAL]

Attest:

RUTH C. MASON
Attesting Officer

C. MARSHALL DANN
Commissioner of Patents and Trademarks